Patented Feb. 23, 1926.

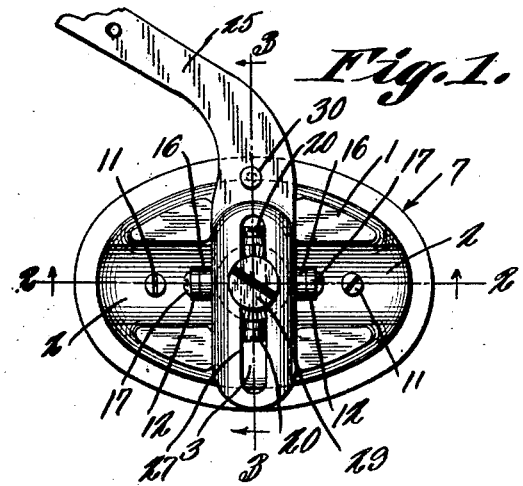

1,573,856

UNITED STATES PATENT OFFICE.

ISAAC MERRICK PEASE, OF CINCINNATI, OHIO.

TRUSS PAD.

Application filed September 14, 1923. Serial No. 662,727.

*To all whom it may concern:*

Be it known that I, ISAAC M. PEASE, a citizen of the United States, residing at Cincinnati, in the county of Hamilton and State of Ohio, have invented a new and useful Truss Pad, of which the following is a specification.

This invention aims to provide novel means for attaching a truss pad to a portion of a truss, in such a way that the pad may be adjusted readily and in various ways, the construction being such that there are few or no outwardly projecting, prominently projected parts adapted to wear a hole in the garments of the person to whom the truss is applied.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 shows in plan, a device constructed in accordance with the invention; Figure 2 is a section on the line 2—2 of Figure 1; Figure 3 is a section on the line 3—3 of Figure 1; Figure 4 is a plan showing a portion of the arm; Figure 5 is a plan showing the head of the screw which cooperates with arm delineated in Figure 4.

The device is depicted as comprising an outer plate 1 having a longitudinal groove 2 and a transverse groove 3, an inner plate 4 being shown, the plates 1 and 4 having cooperating sockets 5 provided with registering openings 6. The pad 7 may be of any desired form and may include a body 8 having a recess 9, the body being located within covering 10, the periphery of the covering extending between the plates 1 and 4, the plates being connected by clamping devices 11, such as screws, so as to hold the edge of the covering 10. The device hereinafter described may, however, be used with any sort of a pad.

Supports 12 extend through the plates 1 and 4 and have oppositely extended feet 14 connected by securing elements 15 with the inner plate 4. A shaft 16 is located between the supports 12. Combined pivot and clamping devices 17, such as screws, are mounted to rotate in the supports 12 and are threaded into the ends of the shaft 16. The intermediate portion of the shaft 16 is enlarged, to receive, movably, a rocker 18 provided on its opposite sides with flared openings 19 adapted to receive clamping devices 20, such as screws, the screws being threaded into the shaft 16 intermediate the ends of the shaft.

A stem 21 is movable longitudinally for adjustment in the rocker 18 and may be in the form of a screw threaded into the rocker, the stem being adapted to pass through the openings 6 of the plates 1 and 4 and to enter the recess 9 in the body 8 of the pad 7. The stem 21 has a conical head 22 provided on its outer surface with radial ribs 23, the head being adapted to fit in a recess 24 formed in an arm 25 having ribs 26 adapted to cooperate with the ribs 23 of the head 22 of the stem 21. The arm 25 has a longitudinal slot 27 wherein is received a tightening device or screw 28, including a flat head 29 bearing on the arm 25, the screw being threaded into the stem 21. The flat head 29 of the screw 28 prevents the device from wearing the garments of the person using the device. The arm 25 has any desired number of studs 30 or equivalent elements, adapted to effect a connection between the pad or belt of the truss and the arm 25.

By loosening the screw 28, the pad 7 may be slid longitudinally of the arm 25, the screw moving in the slot 27 of Figure 4. When the screw 28 is seated, the ribs 26 on the arm 25, cooperating with the ribs 23 on the head 22 of the stem 21 will hold the pad 7 against movement longitudinally of the arm 25. The screws 20 may be moved outwardly whereupon the stem 21 may be rotated in the rocker 18, a longitudinal adjustment of the stem being effected and after such an adjustment has been brought about, the screws 20 may be advanced to engage the stem 21, thereby holding the stem against rotation and against longitudinal movement. The flared openings 19 in the rocker 18 permit the rocker to be adjusted after the screws 20 have been advanced, and after the desired adjustment of the rocker 18 in the shaft 16 have been secured, the screw 17 may be advanced, as shown in Figure 2 to bear against the rocker and hold the rocker against movement with respect to the shaft 16.

The general construction of the device is such that a plurality of adjustments may be effected thereby to accommodate the part 7 to the rupture, and to give the desired upward and inward pressure, such as is exerted by the human fingers, for instance in replacing and holding a rupture digitally.

What is claimed is:

1. In a device of the class described, a pad, a shaft, a rocker movable in the shaft, a stem longitudinally adjustable in the rocker, means carried by the shaft for holding the stem in longitudinally adjusted positions in the rocker, and a combined clamping and pivotal connection between the shaft and the pad, said connection engaging the rocker to hold the rocker against movement in the shaft.

2. In a device of the class described, a pad, a shaft, a rocker movable in the shaft, a stem longitudinally adjustable in the rocker, screws threaded into the shaft and engaging the stem, the rocker having openings receiving the screws and permitting the rocker to move with respect to the screws, and a combined clamping and pivotal connection between the shaft and the pad, said connection engaging the rocker to hold the rocker against movement in the shaft.

In testimony that I claim the foregoing as my own, I have hereto affixed my signature.

ISAAC MERRICK PEASE.